US012579814B2

(12) United States Patent
Kumar et al.

(10) Patent No.: US 12,579,814 B2
(45) Date of Patent: Mar. 17, 2026

(54) COMPUTER VISION-BASED ENERGY USAGE MANAGEMENT SYSTEM

(71) Applicant: Dell Products L.P., Round Rock, TX (US)

(72) Inventors: Dhilip S. Kumar, Bangalore (IN); Rajesh Krishnan, Bangalore (IN); Sivaprakasam Rajappan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 407 days.

(21) Appl. No.: 18/127,143

(22) Filed: Mar. 28, 2023

(65) Prior Publication Data

US 2024/0331384 A1     Oct. 3, 2024

(51) Int. Cl.
*G06V 20/52* (2022.01)
*G06V 10/60* (2022.01)
*G06V 40/10* (2022.01)

(52) U.S. Cl.
CPC .............. *G06V 20/52* (2022.01); *G06V 10/60* (2022.01); *G06V 40/10* (2022.01)

(58) Field of Classification Search
CPC ................................ G06V 20/52; G06V 10/60
See application file for complete search history.

(56) References Cited

U.S. PATENT DOCUMENTS

| | | | |
|---|---|---|---|
| 10,028,358 B2 * | 7/2018 | Wendt ................... | H05B 47/105 |
| 2004/0096083 A1 * | 5/2004 | Matsunaga .......... | G05D 1/0274 |
| | | | 382/104 |
| 2005/0015201 A1 | 1/2005 | Fields et al. | |
| 2012/0057755 A1 * | 3/2012 | Berkvens ............. | H05B 47/125 |
| | | | 382/103 |
| 2013/0234840 A1 * | 9/2013 | Trundle ................... | F24F 11/30 |
| | | | 340/12.53 |
| 2016/0323970 A1 * | 11/2016 | Weber ................. | G06F 18/2321 |
| 2019/0340306 A1 * | 11/2019 | Harrison ............... | G06T 15/506 |
| 2020/0357160 A1 | 11/2020 | Kulkarni et al. | |
| 2021/0012089 A1 | 1/2021 | Shlens et al. | |

FOREIGN PATENT DOCUMENTS

WO          2017157967 A1      9/2017

* cited by examiner

*Primary Examiner* — Wassim Mahrouka
(74) *Attorney, Agent, or Firm* — Ryan, Mason & Lewis, LLP

(57) ABSTRACT
A system comprises at least one camera disposed in an environment, and at least one computing node which hosts and executes an energy management system. The energy management system is configured to utilize computer vision processing of the images of the environment to extract information from the images, to utilize the extracted information from the images to determine usage patterns of light sources in the environment, and to generate intelligent recommendations for automated control of the light sources in the environment based on the determined usage patterns, to conserve energy consumption from use of the light sources in the environment.

20 Claims, 6 Drawing Sheets

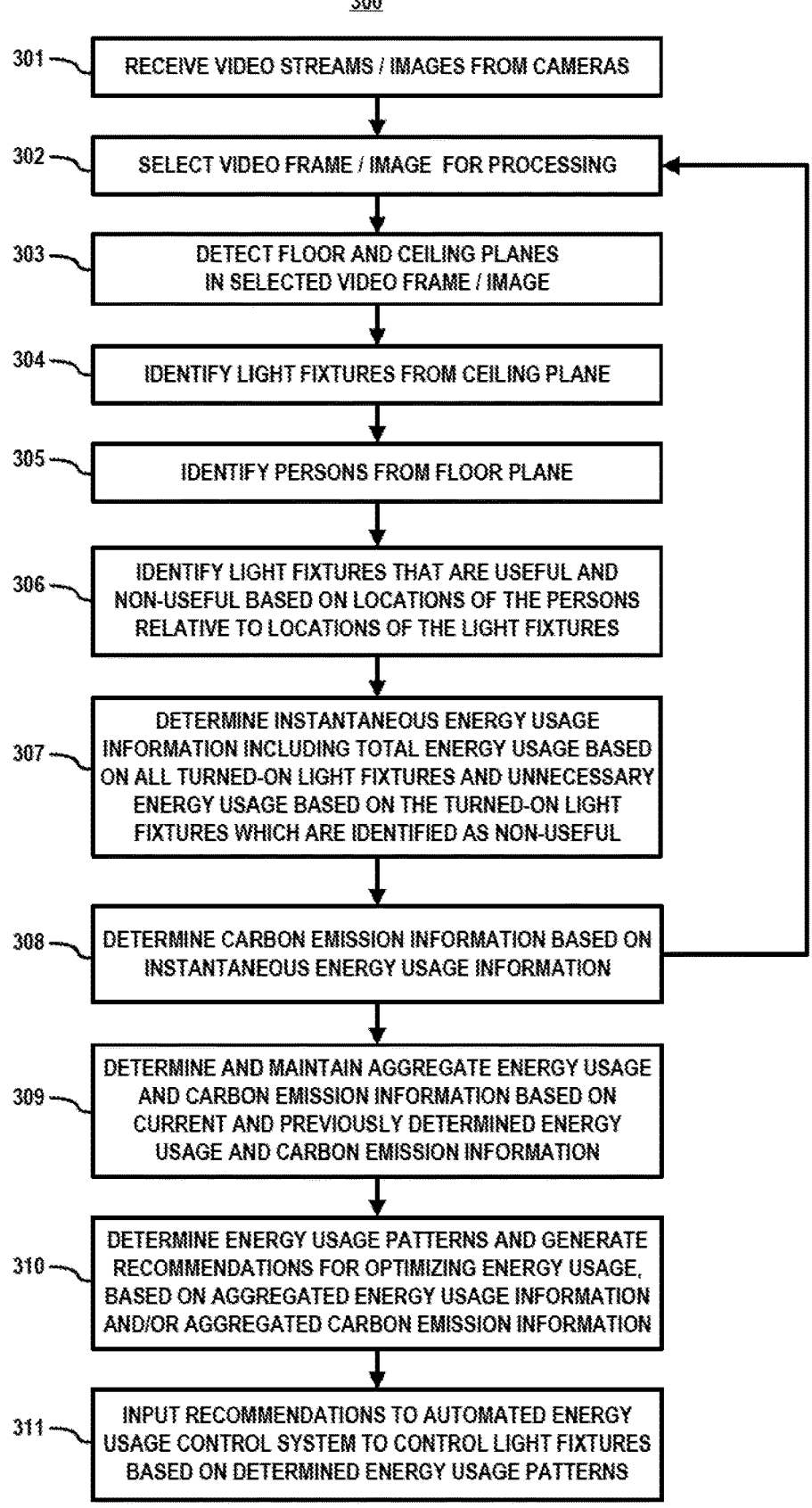

301 — RECEIVE VIDEO STREAMS / IMAGES FROM CAMERAS

302 — SELECT VIDEO FRAME / IMAGE FOR PROCESSING

303 — DETECT FLOOR AND CEILING PLANES IN SELECTED VIDEO FRAME / IMAGE

304 — IDENTIFY LIGHT FIXTURES FROM CEILING PLANE

305 — IDENTIFY PERSONS FROM FLOOR PLANE

306 — IDENTIFY LIGHT FIXTURES THAT ARE USEFUL AND NON-USEFUL BASED ON LOCATIONS OF THE PERSONS RELATIVE TO LOCATIONS OF THE LIGHT FIXTURES

307 — DETERMINE INSTANTANEOUS ENERGY USAGE INFORMATION INCLUDING TOTAL ENERGY USAGE BASED ON ALL TURNED-ON LIGHT FIXTURES AND UNNECESSARY ENERGY USAGE BASED ON THE TURNED-ON LIGHT FIXTURES WHICH ARE IDENTIFIED AS NON-USEFUL

308 — DETERMINE CARBON EMISSION INFORMATION BASED ON INSTANTANEOUS ENERGY USAGE INFORMATION

309 — DETERMINE AND MAINTAIN AGGREGATE ENERGY USAGE AND CARBON EMISSION INFORMATION BASED ON CURRENT AND PREVIOUSLY DETERMINED ENERGY USAGE AND CARBON EMISSION INFORMATION

310 — DETERMINE ENERGY USAGE PATTERNS AND GENERATE RECOMMENDATIONS FOR OPTIMIZING ENERGY USAGE, BASED ON AGGREGATED ENERGY USAGE INFORMATION AND/OR AGGREGATED CARBON EMISSION INFORMATION

311 — INPUT RECOMMENDATIONS TO AUTOMATED ENERGY USAGE CONTROL SYSTEM TO CONTROL LIGHT FIXTURES BASED ON DETERMINED ENERGY USAGE PATTERNS

FIG. 3B

320
```
import cv2
import numpy as np
import open3d as o3d

Jupyter environment detected. Enabling Open3D WebVisualizer.
[Open3D INFO] WebRTC GUI backend enabled.
[Open3D INFO] WebRTCWindowSystem: HTTP handshake server disabled.

depth = np.fromfile("office-green-coding-png.raw", dtype=np.uint16)

depth = np.loadtxt("a542d.txt")

#print(depth)
print(depth.shape)
```

330
```
vertices = []
for x in range(depth.shape[0]):
    for y in range(depth.shape[1]):
        vertices.append((float(x), float(y), depth[x][y]))
pcd = o3d.geometry.PointCloud()
point_cloud = np.asarray(np.array(vertices))
pcd.points = o3d.utility.Vector3dVector(point_cloud)
pcd.estimate_normals()
pcd = pcd.normalize_normals()
o3d.io.write_point_cloud("myfirst.pcd", pcd)
o3d.visualization.draw_geometries([pcd])
```

340
```
curr_max_depth = 4
octree = o3d.geometry.Octree(max_depth = curr_max_depth)
octree.convert_from_point_cloud(pcd)
o3d.visualization.draw_geometries([octree])
```

COMPUTER VISION-BASED ENERGY USAGE MANAGEMENT SYSTEM

COPYRIGHT NOTICE

TECHNICAL FIELD

This disclosure relates generally to techniques for managing energy usage of resources such as lighting in a given environment such as an office workspace or factory, etc.

BACKGROUND

There are concerted efforts to reduce greenhouse-gas emissions and protect against climate change. For example, such efforts include utilizing renewable energy sources for electrical power generation systems to reduce the amount of carbon dioxide ($CO_2$) that is emitted into the atmosphere as a result of generating and utilizing electrical energy. Many companies and organizations utilize renewable energy sources to reduce the amount of electricity-related carbon emission which results from power consumption of electrical systems, components and devices, such as light fixtures, computers, servers, etc., which are utilized in administrative buildings, data storage facilities, and other office workplace environments, etc., of the companies. Despite acquiring and using renewable energy sources, wasted energy consumption resulting from, e.g., leaving unnecessary lights turned on throughout the day in an office workplace area, can still result in unnecessary carbon emission.

Various techniques can be utilized to reduce light energy consumption in a given workplace environment to conserve energy and, thus, reduce carbon emission. For example, office lighting can be controlled using motion sensors which are configured to detect motion and automatically turn on lighting when motion is detected, and automatically turn off lighting when motion is not detected for some period of time. However, such motion detectors are only effective in conference rooms and other small office rooms. In relatively large open workspaces where many employees work in separate cubicles (i.e., partially enclosed office workspaces that are separated from neighboring workspaces by partitions that are usually 4-6 feet tall), the open workspace typically includes overhead lighting that is arranged to enable uniform lighting throughout the workspace. Such overhead lighting is typically not automatically controlled by motion sensors and, consequently, the facility management personnel have the responsibility to turn on and off the lights.

Many companies allow a hybrid work model in which employees are allowed to work at the office and work remotely at home, as desired. For example, a common hybrid model requires an employee to work in the office for at least two days per week, and can work remotely at home for the remainder of the week. In some instances, the employees are allowed to select which days of the week to work in the office workplace. There are certain employees that always choose to work at the office workplace on the same days of the week, while other employes choose to work at the office workplace on random days, which can vary week to week. In such instances, it is difficult for the facility management personnel to manually control the lighting in the office workspace in a way that minimizes light energy consumption.

SUMMARY

Exemplary embodiments of the disclosure include computer vision-based energy usage management techniques. For example, an exemplary embodiment includes a system which comprises at least one camera disposed in an environment, and at least one computing node which hosts and executes an energy management system. The energy management system is configured to utilize computer vision processing of the images of the environment to extract information from the images, to utilize the extracted information from the images to determine usage patterns of light sources in the environment, and to generate intelligent recommendations for automated control of the light sources in the environment based on the determined usage patterns, to conserve energy consumption from use of the light sources in the environment.

Other embodiments will be described in the following detailed description of exemplary embodiments, which is to be read in conjunction with the accompanying figures.

BRIEF DESCRIPTION OF THE DRAWINGS

FIG. 3A illustrates a flow diagram of a method for computer vision-based energy usage management, according to an exemplary embodiment of the disclosure.

FIG. 3B illustrates exemplary program code to implement computer vision-based energy usage management, according to an exemplary embodiment of the disclosure.

DETAILED DESCRIPTION

Exemplary embodiments of the disclosure will now be described in further detail with regard to computer vision-based energy usage management systems and methods which are configured to intelligently monitor and track energy usage in a given environment, and provide intelligent recommendations for reducing unnecessary energy consumption through automated and/or manual remedial actions. For purposes of illustration, exemplary embodiments will be described herein with reference to computer vision-based energy usage management systems and methods which are configured to utilize computer vision to regularly monitor the use of light fixtures (e.g., overhead ceiling lights) in a given workplace environment (e.g., monitor which lights are turned on and turned off) and determine the presence of individuals (e.g. employees, managers, etc.) within the given workplace and their proximity to such light fixtures, to thereby track, e.g., an amount of unnecessary energy consumed by light fixtures in the given environment which are turned on in areas where no individuals are in proximity to such light fixtures. It is to be understood, however, that the computer vision-based energy usage management systems and methods disclosed herein can be utilized to monitor the use of other types of electrical components, systems or devices that utilized by individuals.

It is to be understood that the term "computer vision" or "computer vision processing" as used herein is meant to broadly refer to the use of artificial intelligence systems and techniques to perform automated tasks for acquiring, processing, and analyzing a digital image, sequences of digital images, video streams, etc., to extract or otherwise derive meaningful information from the digital images or videos, etc., and utilize such information to compute or otherwise produce numerical or symbolic information, make intelligent decisions, and/or perform automated tasks, for a given application (e.g., energy usage management applications as disclosed herein). For example, the exemplary computer vision systems and techniques as disclosed herein utilize machine learning and neural networks, such as deep learning neural networks, convolutional neural networks (CNNs), etc., to perform tasks such as (i) detecting and segmenting regions of a given digital image or video frame, which are deemed relevant for further analysis, (ii) converting the digital image data into different forms (e.g., depth maps, point clouds, etc.) to extract relevant image features, (iii) performing object recognition to identify/detect learned objects in the images, etc.

Figure 1:
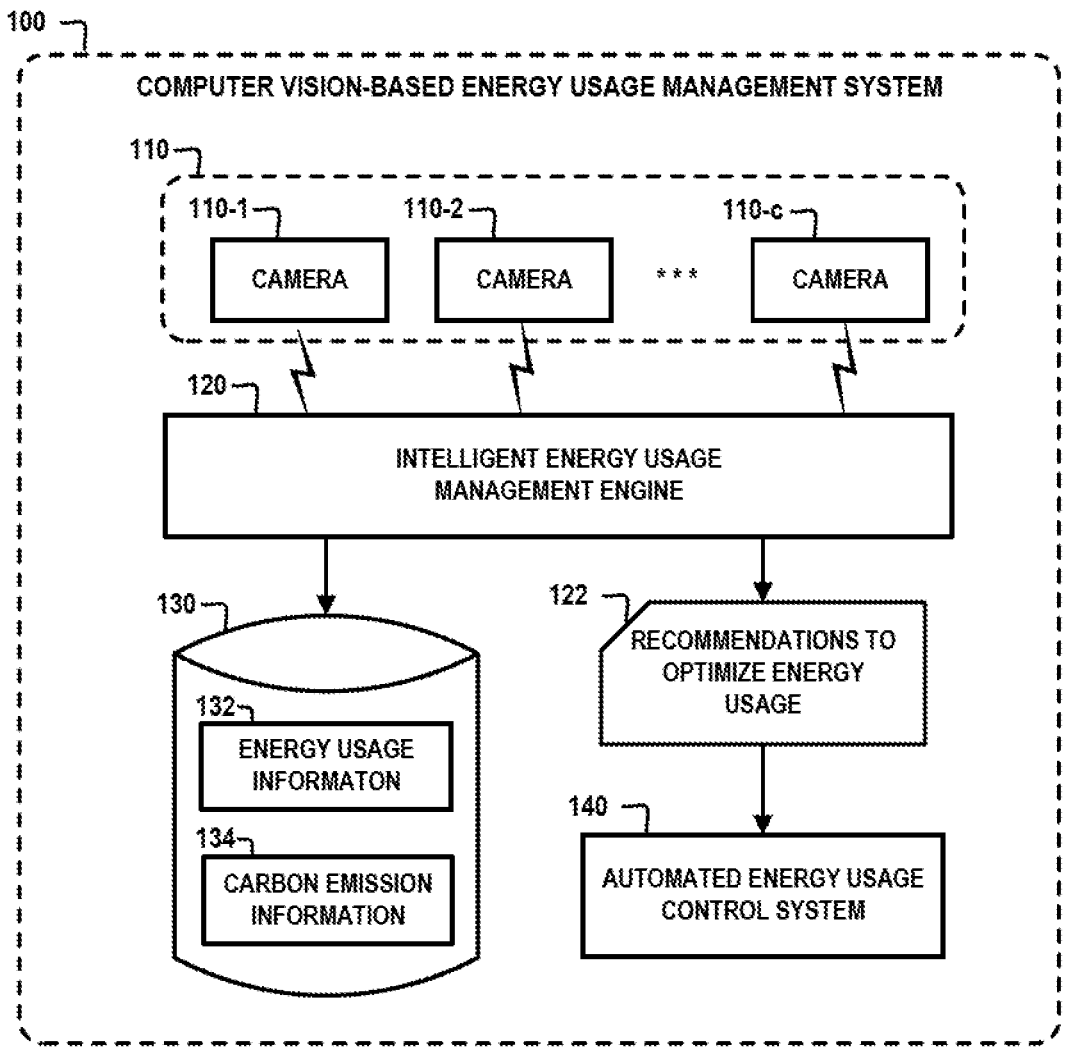
FIG. 1 schematically illustrates a computer vision-based energy usage management system, according to an exemplary embodiment of the disclosure.

FIG. 1 schematically illustrates a computer vision-based energy usage management system, according to an exemplary embodiment of the disclosure. More specifically, FIG. 1 schematically illustrates a computer vision-based energy usage management system 100 which comprises a plurality of cameras 110-1, 110-2, . . . , 110-c (collectively, cameras 110), an intelligent energy usage management engine 120, a data store 130, and an automated energy usage control system 140. The data store 130 comprises a repository to persistently store and manage various types of data and information that is generated by the intelligent energy usage management engine 120 including, but not limited to, energy usage information 132 and carbon emission information 134, as will be discussed in detail below. The intelligent energy usage management engine 120 utilizes the energy usage information 132 and/or carbon emission information 134 to intelligently generate recommendations 122 for optimizing energy usage, and provide such recommendations 122 to the automated energy usage control system 140. The automated energy usage control system 140 is configured to utilize such recommendations 122 to perform automated operations to control and optimize energy usage in a given environment (e.g., control the lighting in a given office workspace of a building).

The computer vision-based energy usage management system 100 utilizes the cameras 110 to capture video streams and/or images of a given environment, e.g., office workspace, on a continuous or periodic basis. The intelligent energy usage management engine 120 utilizes the video streams and/or images to intelligently monitor resource usage (e.g., light usage) over time to discover patterns of resource utilizations. For example, the intelligent energy usage management engine 120 processes the captured video streams and/or images to (i) detect the location and status (e.g., on or off) of light fixtures in the given environment (e.g., entire workspace floor or room); (ii) detect the presence of individuals within the given environment, and (iii) determine the location and proximity of the individuals relative to the light fixtures. The intelligent energy usage management engine 120 determines the amount of light energy consumed in the given environment (e.g., based on the light fixtures that are turned on), and the amount of energy consumed in a non-optimal manner, e.g., amount of energy consumed by light fixtures in the given environment which are turned on in areas where no individuals are in proximity to such light fixtures.

In this manner, the computer vision-based energy usage management system 100 can intelligently monitor resource usage (e.g., light usage) over time, e.g., minutes, hours, days, weeks, months, years, etc., to determine the efficiency or non-efficiency of resource utilization within the given environment over time, and determine and recommend resource usage patterns to reduce or otherwise minimize unnecessary resource usage for purposes of energy conservation. In addition, in some embodiments, the intelligent energy usage management engine 120 is configured to determine or otherwise estimate an amount of carbon emission that results from the resource usage in the given environment over time, e.g., minutes, hours, days, weeks, months, years, etc., and determine an amount of unnecessary carbon emission which results from the non-efficient resource utilization within the given environment over time. The carbon emission information is recorded on a regular basis, and can be utilized as a baseline factor to determine and recommend resource usage patterns (e.g., light usage in the given environment) to reduce or otherwise minimize unnecessary carbon emission with regard to resource utilization within the given environment.

In some embodiments, the intelligent energy usage management engine 120 is configured as a centralized computing system that receives videos streams and/or images from the cameras 110 that are disposed over multiple floors, individual spaces, and rooms of a given building (e.g., office building). In this regard, the intelligent energy usage management engine 120 can determine resource utilization efficiency and carbon emission information on, e.g., a floor-by-floor basis or space-by-space basis, and provide recommendations for optimizing energy usage efficiency and minimizing carbon emission in a more targeted manner based on the activities and energy usage pattern of individuals (e.g., employees, staff) that are commonly present in the different floors, spaces, and rooms of the given building.

Figure 2:
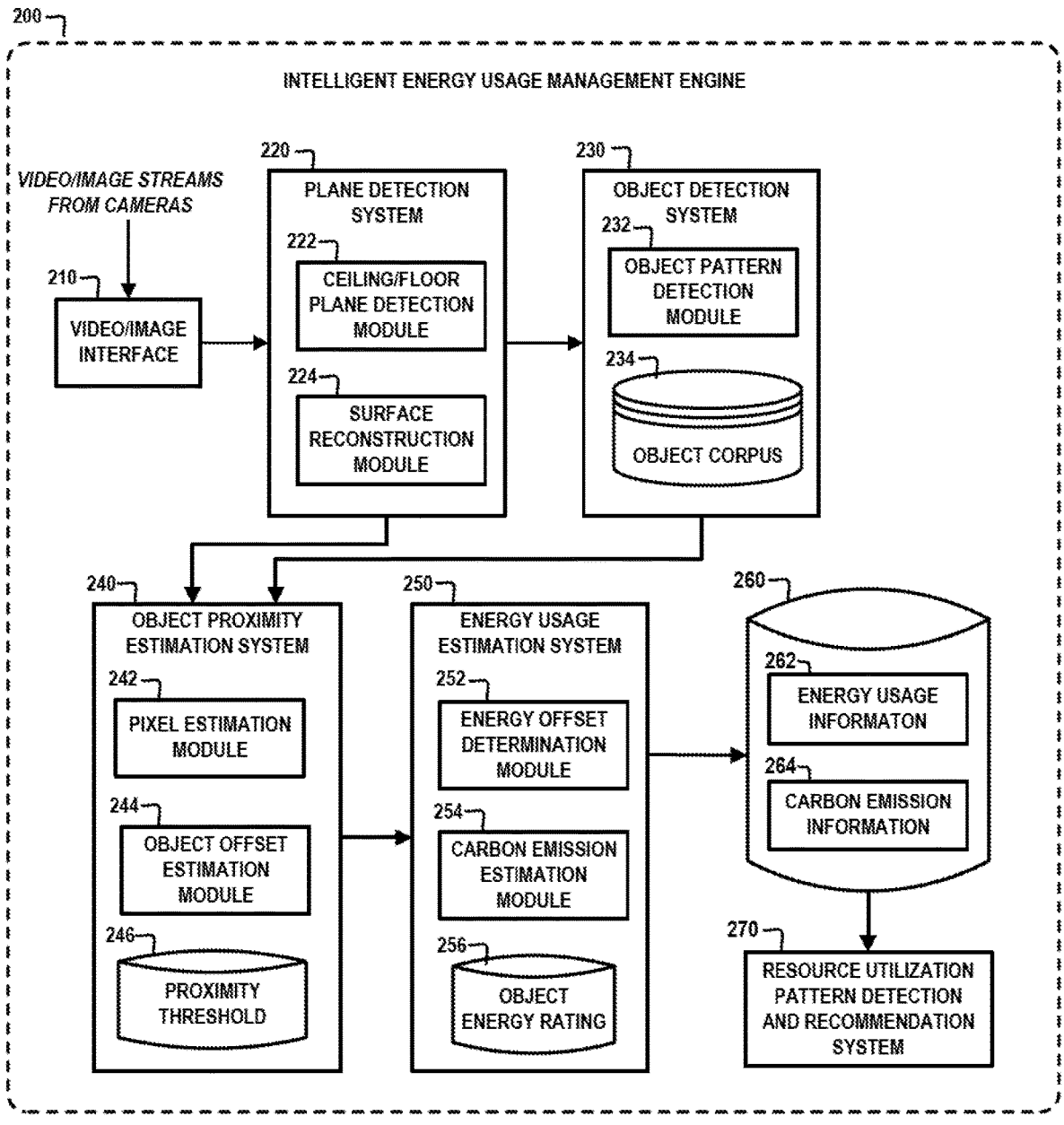
FIG. 2 schematically illustrates an intelligent energy usage management engine which can be employed in the system of FIG. 1, according to an exemplary embodiment of the disclosure.

FIG. 2 schematically illustrates an intelligent energy usage management engine which can be employed in the system of FIG. 1, according to an exemplary embodiment of the disclosure. In particular, FIG. 2 schematically illustrates an intelligent energy usage management engine 200 which comprises a video/image interface 210, a plane detection system 220, an object detection system 230, an object proximity estimation system 240, an energy usage estimation system 250, a data store 260, and a resource utilization pattern detection and recommendation system 270. The plane detection system 220 comprises a ceiling/floor plane detection module 222, and a surface reconstruction module 224. The object detection system 230 comprises an object pattern detection module 232 and an object corpus database 234. The object proximity estimation system 240 comprises a pixel estimation module 242, an object offset estimation module 244, and a configurable proximity threshold 246. The energy usage estimation system 250 comprises an energy offset determination module 252, a carbon emission estimation module 254, and a database of object energy rating data 256.

The video/image interface 210 is configured to receive, buffer, and process video streams and/or still image streams that are captured by one or more cameras disposed within a given environment, and transmitted to the intelligent energy usage management engine 200. For example, in the context of an open workspace on a given floor of an office building, depending on the size and shape of the workspace area, one or more cameras may be strategically positioned to capture video/images of the entire workspace area. Depending on the size and shape of the workspace area, multiple cameras can be used to capture all areas of the workspace, wherein certain areas are not visible by a given camera.

In some embodiments, the video streams and/or sill image streams may be captured using existing video surveillance cameras of a closed-circuit television (CCTV) security system, wherein from a surveillance perspective, it may be assumed that every blind spot of a given workspace area is viewable by at least one surveillance camera. The cameras are preferably positioned (e.g., ceiling cameras) in a manner to capture images with the requisite objects to be tracked and monitored, e.g., ceiling light fixtures, individuals sitting at desks within cubicles, etc.

In some embodiments, the video/image interface 210 is configured to extract video frames from each video stream and input extracted video frames or still images to the plane detection system 220. For example, with a video stream that includes 30 frames per second, video/image interface 210 can be configured to extract one video frame per second of a given video steam, and input the extracted video frame to the plane detection system 220. In embodiments where multiple cameras are utilized to monitor the given workspace, the video/image interface 210 can be configured to select, for processing, one video frame from each video stream of each camera in a round robin manner. In some embodiments, where multiple images from different cameras are needed to fully capture an entire workspace, the video streams from the different cameras can be time-aligned/synchronized such that the video frames extracted from each video stream of each camera correspond to a same time.

The plane detection system 220 is configured to detect a ceiling plane and a floor plane in a given input video frame image or still image and extract a ceiling plane image and floor plane image, which are used to detect target objects, e.g., light fixtures and persons, within the given input video frame image or still image. In some embodiments, the plane detection system 220 utilizes machine learning models (e.g., convolutional neural networks, deep learning neural networks, etc.) and artificial intelligence techniques to detect and extract ceiling and floor plane images.

For example, in some embodiments, the ceiling/floor plane detection module 222 is configured to detect a ceiling plane and floor plane in a given input video frame image by generating a depth map (or depth image) from the input image, and generating a three-dimensional model (e.g., point cloud) from the depth image. As is known in the art, a depth map is a two-dimensional (2D) image which contains information relating to a distance of surfaces of objects in a scene from a viewpoint (e.g., intensity values in the depth image represent the distance of the object from a viewpoint). The depth image, which shows the distances between the camera and the surfaces of objects in the scene, is used as a primary source of texture information for the plane detection process, as the depth image information provides useful information in challenging texture conditions. The depth image represents geometric information of each point in a scene, wherein points from the same plane have similar spatial attributes.

Moreover, in some embodiments, the ceiling/floor plane detection module 222 is configured to generate a three-dimensional (3D) model from the 2D depth image. For example, in some embodiments, the ceiling/floor plane detection module 222 is configured to generate a point cloud data set from the depth image, wherein the point cloud comprises a discrete set of data points in a 3D space which represents objects in the depth image. Essentially, a point cloud is a 3D model which comprises a collection of points that are plotted in a 3D space. In some embodiments, the 2D depth image is converted into a 3D point cloud model where each pixel of the depth image represents one point in the 3D point cloud. The data points of a point cloud essentially comprise a collection of points that have been properly registered and aligned along a major axis.

Further, in some embodiments, the surface reconstruction module 224 implements a point cloud shape detection process to convert a given point cloud into geometric drawings with lines to reduce modelling time. For example, in some embodiments, the surface reconstruction module 224 implements a random sample consensus (RANSAC) process as a point cloud shape detection process which is configured to divide a given point cloud into flat planar surfaces. As is known in the art, RANSAC is an iterative method to estimate optimal model parameters of a mathematical model from a set of observed data that contains outliers, when outliers are not to be accorded influence on the values of the estimates. As explained in further detail below, the surface reconstruction module 224 implements a shape detection process which includes multiple processing stages, including a segmentation stage, a refinement stage, and a boundary tracing stage.

The output of the plane detection system 220 comprises a ceiling plane image and floor plane image, which are extracted from a given input image. The ceiling plane image is assumed to include relevant objects such as light fixtures, and the floor plane image is assumed to include individuals that may be present in the input image. The ceiling plane and floor plane images, and corresponding point cloud data are input to the object detection system 230 for further processing.

The object detection system 230 is configured to process the extracted ceiling plane and floor plane images and associated point cloud data to detect object patterns that correspond to target objects such as light fixtures in the ceiling plane image and individuals in the floor plane image. In some embodiments, the object pattern detection module 232 utilizes machine learning models (e.g., trained neural networks) to identifying target objects in the ceiling and floor plane images, wherein the object corpus database 234 comprises data that is used to train machine learning models to detect target objects. In some embodiments, the object pattern detection module 232 identifies light fixtures in the ceiling plane image and generates a first object position image based on the ceiling plane image, wherein the first object position image provides a representation of the location of the detected light fixtures within the area corresponding to the ceiling plane image. In addition, the object pattern detection module 232 identifies persons in the floor plane image and generates a second object position image based on the floor plane image, wherein the second object position image provides a representation of the location of the detected persons within the area corresponding to the floor plane image.

The object position images generated by the object detection system 230, and the ceiling and floor plane images and associated point cloud data generated by the plane detection system 220 are input to the object proximity estimation system 240. The object proximity estimation system 240 is configured to determine each light fixture that is in close proximity to at least one person, based on the proximity threshold 246, and determine each light fixture that is not in close proximity to at least one person, based on the proximity threshold 246. In some embodiments, the object proximity estimation system 240 implements methods to measure the distance between objects in a given image.

For example, the pixel estimation module 242 implements methods that are configured to segment the pixels in the image to determine for each detected object (e.g., persons, light fixture), a set of pixels corresponding to the detected object. This allows bounding boxes to be defined around the pixels of the detected objects and utilize the bounding boxes to compute/determine information that is needed to estimate the distance between objects. Moreover, in some embodiments, the pixel estimation module 242 is configured to determine the detected light fixtures in the given ceiling plane image which are turned on and turned off based, for example, the surrounding pixel values which correspond to light intensity.

The object offset estimation module 244 is configured to determine the distance between the detected light fixtures and the detected persons, and determine which light fixtures are in close proximity to at least one person, based on the specified proximity threshold. Each light fixture that is deemed to be in close proximity to at least one person is deemed to be "useful" while each light fixture that is deemed to not be in close proximity to at least one person is deemed "non-useful." Furthermore, in some embodiments, each "non-useful" light fixture that is determined to be turned on at the given time is deemed to contribute to unnecessary energy usage at the given time. In some embodiments, the object offset estimation module 244 is configured to overlay the first and second object position images (provided by the object detection system 230) and determine which light fixtures are useful and non-useful based on the locations of the identified persons relative to the locations of the identified light fixtures. An exemplary process for overlaying object position images to determine the distance between objects will be discussed below in conjunction with FIG. 4.

Essentially, the object proximity estimation system 240 generates information regarding the operating status (e.g., on or off) and current characterization (e.g., useful or non-useful) of each light fixture, which is utilized by the energy usage estimation system 250 to compute energy usage and carbon emission information. The energy usage estimation system 250 is configured to compute instantaneous values of energy usage information and carbon emission information, based on each input video frame or still image that is processed.

For example, the energy offset determination module 252 is configured to process the information provided by the object proximity estimation system 240 to determine instantaneous energy usage information such as (i) a total energy usage based on all turned-on light fixtures, and (ii) total unnecessary energy usage based on the turned-on light fixtures which are identified as non-useful. The database of object energy rating data 256 comprises information regarding the known power usage ratings (e.g., Watt-second or Watt-minute) of the light fixtures within the given office workspace. The energy offset determination module 252 utilizes the database of object energy rating data 256 to determine instantaneous energy usage information. The instantaneous energy usage information is persisted in the data store 260, and utilized to compute aggregated energy usage information over time. The energy usage information 262 comprises instantaneous and aggregated energy usage information.

The carbon emission estimation module 254 implements methods to determine instantaneous carbon emission information based on the instantaneous energy usage information. For example, the carbon emission estimation module 254 determines instantaneous carbon emission information such as (i) a total amount of carbon emission based on all turned-on light fixtures at the given time, and (ii) total unnecessary amount of carbon emission based on the turned-on light fixtures which are identified as non-useful. The instantaneous carbon emission information is persisted in the data store 260, and utilized to compute aggregated carbon emission information over time. The carbon emission information 264 comprises instantaneous and aggregated carbon emission information.

In some embodiments, the amount of electricity-related carbon emission $CO_2$ is estimated based on source(s) that are utilized to generate electricity (e.g., nuclear, coal-fired plant, renewable source, etc.) and the amount of energy consumed. For example, the intelligent energy usage management engine may utilize a priori knowledge with regard to, e.g., an amount of carbon emission per unit amount of consumption of electric energy generated by a given electricity-generating source, to estimate an actual amount of carbon emission which results from the power consumption of the light fixtures within the given workplace environment.

The resource utilization pattern detection and recommendation system 270 is configured to perform various functions. For example, in some embodiments, the resource utilization pattern detection and recommendation system 270 is configured to process the aggregated energy usage information and/or aggregated carbon emission information to discover resource usage patterns over time. The resource utilization pattern detection and recommendation system 270 can analyze the aggregated energy usage information to determine patterns of light usage in the given office workspace over time (e.g., hourly, daily, monthly, quarterly, and yearly) and provide recommendations for manually and/or automatically controlling the lights within a given office workspace, based on the usage patterns of persons (e.g., employees, staff, managers) that work, or are otherwise present, in the office workspace on a regular or periodic basis.

In some embodiments, the resource utilization pattern detection and recommendation system 270 can analyze the aggregated carbon emission information to determine resource usage patterns that will reduce carbon emissions. There can be instances, however, where the electricity-related carbon emission resulting from light energy consumption in the given office workspace is minimal as a result of the use of carbon-free renewable energy source(s) to provide electric power to the given office building. In such instances, controlling the light usage can be directed more to reducing power consumption for monetary cost savings, and not as much as reducing carbon emissions.

In the context of a large office building with two or more floors/floorspaces, and wherein each floor comprises one or more open workspace areas, etc., the intelligent energy usage management engine 200 is utilized as a centralized system to receive and process video streams and images from the cameras on some or all the floors and workspace areas of the office building. In such an instance, multiple instances of the various system components 210, 220, 230, 240, and 250 can be utilized to enable parallel processing of video streams/images provided from cameras in different floors and workspaces, and thereby monitor and generate energy usage and carbon emission information on a floor-by-floor and/or room-by-room basis.

FIG. 3A illustrates a flow diagram of a method for computer vision-based energy usage management, according to an exemplary embodiment of the disclosure. In some embodiments, FIG. 3A illustrates a method 300 which is implemented by an intelligent energy usage management engine according to an exemplary embodiment of the disclosure. For purposes of illustration, the method 300 of FIG. 3A will be discussed in the context of the exemplary embodiments of FIGS. 1 and 2, wherein it is assumed that FIG. 3A illustrates exemplary modes of operation of an intelligent energy usage management engine such as those shown in FIGS. 1 and 2.

The intelligent energy usage management engine receives video streams and/or images from surveillance cameras that are located in a given environment which is being monitored for resource usage (block 301). For example, as noted above, in an office building, a plurality of cameras can be located in a given workspace of the office building to monitor resource usage in the given workspace where, e.g., employees are commonly seated at desks to work. Depending on the layout of the given workspace, the cameras can be strategically disposed at various locations to provide different views to capture an entire area of the workspace.

In some embodiments, some or all of the cameras are configured to transmit video streams to the intelligent energy usage management engine on a continuous basis. In some embodiments, some or all of the cameras are configured to capture still images on a periodic basis (e.g., every 1 second, 5 seconds, minute, etc.) and transmit the still images to the intelligent energy usage management engine. As the intelligent energy usage management engine receives video streams and/or still images from the camera, a video frame or still image is selected at a given time for processing (block 302). It is to be noted that in some embodiments, the instantaneous computations performed (e.g., blocks 303-308) with respect to a given video frame or still image are performed on a periodic basis (e.g., every second, 5 seconds, minute, 5 minutes, etc.) depending on the desired accuracy level for estimating energy usage and carbon emission data. For example, with a video stream that includes 30 frames per second, the intelligent energy usage management engine can be configured to process one video frame per second of a given video stream. In embodiments where multiple cameras are utilized to monitor the given workspace, the intelligent energy usage management engine can be configured to select, for processing, one video frame from each video stream of each camera in a round robin manner.

Next, the selected video frame/image is processed to detect a floor plane and a ceiling plane in the video frame/image (block 303). As noted above, in some embodiments, the floor and ceiling planes are detected using an artificial intelligence algorithm which comprises generating a depth image (e.g., depth map), generating a point cloud from the depth image, and utilizing a point cloud shape detection process to render the point cloud into a collection of flat surfaces (e.g., an image comprising reconstructed surfaces). The floor plane and ceiling plane in the selected video frame/image are determined from planar surfaces in the image of reconstructed surfaces. An exemplary process for detecting floor and ceiling planes in a video frame/image will be explained in further detail below.

The process then proceeds by identifying light fixtures in the workspace from the detected ceiling plane image (block 304) and identifying persons that are present in the workspace from the floor plane image (block 305). More specifically, in some embodiments, a machine learning object detection process is utilized to identify objects (e.g., light fixtures, persons) in the ceiling plane and floor plane images by analyzing the size, position, orientation, and point density characteristics of objects in the ceiling plane and floor plane images to infer object classes and thereby identify objects that are classified as light fixtures and persons.

In addition, the light fixture identification process comprises generating a first object position image based on the ceiling plane image, which provides a representation of the location of the identified light fixtures in the ceiling plane image. In this instance, the first object position image provides an indication of the location/arrangement of the identified light fixtures within the given area of the workspace as captured in the given video frame/image that is being processed. Further, the person identification process comprises generating a second object position image based on the floor plane image, which provides a representation of the location of the identified persons in the floor plane image. In this instance, the second object position image provides an indication of the location of the identified persons (as well as the number of persons) within the given area of the workspace as captured in the given video frame/image that is being processed.

Next, the process proceeds by identifying light fixtures that are useful and non-useful based on the locations of the identified persons relative to the locations of the identified light fixtures (block 306). For example, in some embodiments, this process is performed by overlaying the first and second object position images and utilizing a proximity threshold value or measure to (i) determine each light fixture that is in close proximity to at least one person, based on the proximity threshold, and (ii) determine each light fixture that is not in close proximity to at least one person, based on the proximity threshold. Each light fixture that is deemed to be in close proximity to at least one person is deemed to be "useful" while each light fixture that is deemed to not be in close proximity to at least one person is deemed "non-useful." Furthermore, in some embodiments, each "non-useful" light fixture that is determined to be turned on at the given time is deemed to contribute to unnecessary energy usage at the given time.

The intelligent energy usage management engine utilizes the information regarding the operating status (e.g., on or off) and current characterization (e.g., useful or non-useful) of each light fixture to determine energy usage information such as (i) a total energy usage based on all turned-on light fixtures, and (ii) total unnecessary energy usage based on the turned-on light fixtures which are identified as non-useful (block 307). For example, it is known that the energy consumption (I) of a given lighting element in the units of, e.g., Watt-second, Watt-minute (Wmin), or Watt-hour (Wh), etc., can be determined as $E=P \times t$, where P denotes a power rating in Watts, and t denotes time (e.g., in seconds, minutes, or hours), where 1 Watt=3600 joule/hour (or 1 joule/second).

Further, the intelligent energy usage management engine determines carbon emission information based on the instantaneous energy usage information (block 308). For example, as noted above, in some embodiments, the intelligent energy usage management engine determines instantaneous carbon emission information such as (i) a total amount of carbon emission based on all turned-on light fixtures at the given time, and (ii) total unnecessary amount of carbon emission based on the turned-on light fixtures which are identified as non-useful. As noted above, the amount of electricity-related carbon emission $CO_2$ emissions) can be estimated based on source(s) that are utilized to generate electricity (e.g., nuclear, coal-fired plant, renewable source, etc.) and the amount of energy consumed. For example, the intelligent energy usage management engine may utilize a priori knowledge with regard to, e.g., an amount of carbon emission per unit amount of consumption of electric energy generated by a given electricity-generating source, to estimate an actual amount of carbon emission which results from the power consumption of the light fixtures within the given workplace environment.

As shown in FIG. 3A, the process flow comprises a repeating process loop (e.g., blocks 302-308), where the intelligent energy usage management engine selects and processes a next video frame or still image to compute instantaneous energy usage information and carbon emission information based on the current light fixture usage and proximity of persons to turned on light fixtures, as determined by analyzing the next video frame or still image. As noted above, the instantaneous energy usage and carbon emission information is determined from the video frames/still images on a continuous/periodic basis e.g., in the order of second(s) or minute(s). This allows the intelligent energy usage management engine to monitor energy usage and unnecessary energy usage and number people in the given workspace with high granularity and precision (e.g., every second or minute).

The intelligent energy usage management engine will periodically determine and maintain (e.g., persistently store) aggregate energy usage and carbon emission information based on the current and previously determined energy usage and carbon emission information (block 309). For example, in embodiments where the intelligent energy usage management engine determines instantaneous energy usage and carbon emission information (from the video frames/still images) every second, the intelligent energy usage management engine can compute aggregated energy usage and carbon emission information every minute based on the instantaneous energy usage and carbon emission information computed for the last 60 seconds. As a further example, in embodiments where the intelligent energy usage management engine determines instantaneous energy usage and carbon emission information (from the video frames/still images) every minute, the intelligent energy usage management engine can compute aggregated energy usage and carbon emission information every hour based on the instantaneous energy usage and carbon emission information computed for the last 60 minutes. The aggregated energy usage and carbon emission information, which is derived every minute or hour, can be further aggregated to provide aggregated energy usage and carbon emission information on a daily basis, weekly basis, monthly basis, etc.

As noted above, the intelligent energy usage management engine can be configured to track energy consumption of light fixtures in units of Watt-second or Watt-minute by knowing the wattage rating of the light fixtures. For example, a one watt light source consumes 1 joule of electrical energy every second. The total amount of energy consumed by a 100 watt light fixture every second can be estimated by (1 joule/second)×(100 watts)×(1 second)=100 joules. Assuming the 100 watt light fixture is determined to be on for 5 minutes, the total amount of energy consumed by a 100 watt light fixture can be estimated by (1 joule/second)×(100 watts)×(60 seconds/minute)×(5 minutes)=30,000 joules. While such units of energy usage (e.g., Watt-second or Watt-minute) may be relatively small, the instantaneous energy usage computations (in block 307) are preferably performed at such fine granularity (e.g., every second or minute) to provide higher precision in tracking the aggregate energy usage and wasted energy usage over minutes, hours, days, etc.

The intelligent energy usage management engine determines energy usage patterns and generates recommendations for optimizing energy usage, based on the aggregated energy usage information and/or aggregated carbon emission information (block 310). For example, as noted above, in some embodiments, the aggregated energy usage information and/or aggregated carbon emission information is processed to determine patterns of light usage in the given office workspace over time (e.g., hourly, daily, monthly, quarterly, and yearly) and provide recommendations for manually and/or automatically controlling the lights within a given office workspace, based on the usage patterns of persons (e.g., employees, staff, managers) that work, or are otherwise present, in the office workspace on a regular or periodic basis.

In some embodiments, the intelligent energy usage management engine will input the recommendations for optimizing energy usage to an automated energy usage control system to control the operation of the light fixtures based on the determined energy usage patterns (block 311). For example, assume the intelligent energy usage management engine determines from the energy usage patterns that on a given day of the week, no employes are present in a given office workspace or portion of the given office workspace during work hours. In such instance, the intelligent energy usage management engine can generate a recommendation to turn off the light fixtures in the given office workspace or portion thereof, based on the knowledge derived from the energy usage patterns that not person is likely to be present in the given office workspace or portion thereof during work hours.

FIG. 3B illustrates exemplary program code to implement computer vision-based energy usage management, according to an exemplary embodiment of the disclosure. More specifically, FIG. 3B illustrates blocks of program code 320, 330, and 340 that are associated with modes of operation of the plane detection system 220 (FIG. 2) to detect and extract ceiling and floor plane images from a given input video frame/still image (e.g., perform process in block 303 of FIG. 3A). The program code block 320 executes a process to generate a depth image, and the program code block 330 executes a process to generate an octree data structure from the point cloud data.

As noted above, a given surveillance camera image is converted into a depth image (e.g., RGB depth images), the depth image is converted into a point cloud, and the point cloud is converted into geometric drawings with lines to reduce modelling time. The procedure is divided into three stages: segmentation, refinement, and boundary tracing. The point cloud determines the position and size of objects on the floor and ceiling and as such, the objects can be filtered using the major axis, and the remaining left-out objects are computed to determine energy usage and carbon emission.

As noted above, a RANSAC process is utilized to render the point cloud into a collection of flat surfaces. Considering that the coarse objects under scrutiny are, in fact, flat, we set our sights on acquiring smooth, flat surfaces. To simplify further processing, the extracted planar segments are ranked by point count from highest to lowest, and the position and normal of each segment are computed. The orientation of the segments can be computed using such data. The point cloud is projected onto y-z and x-z planes, and an octree division process is performed on the point could, and the octrees with the highest point densities are obtained.

The floor and ceiling planes are flat and perpendicular to an x-y plane, and the point cloud is aligned along a Z axis. Because of this, the points used to depict these objects tend to congregate around specific z values. To do this, the point cloud is first projected into the y-z plane and then the x-z plane, to obtain a densely packed line of points along the Z axis. The process locates the z-coordinates with the highest data density.

An octree division process is applied to the projected point cloud data, and the process collects the point density in each cell of the octree. The octrees that meet a preset criterion are retained by comparing the percentage change in point density between successive divisions of the octree. During this process, the points of the octree divides are determined, and the resulting horizontal planar segments are labelled as floors or ceilings. The remaining horizontal pieces are discarded.

The above-described process allows the floor and ceiling to be readily detected as two flat, horizontal surfaces. The process discards clutter information and retains only vertical flat surfaces that fulfil the requirements. The remaining segments can be classified as either being parallel to the y-z plane or the x-z plane. The process then merges the planar surfaces that correspond to cuboid walls and maintains the planar surfaces in the perimeter that are within a minimum distance from a bounding box of the point cloud. The remaining portions are discarded, resulting in the detected floor and ceiling levels planes.

Figure 4:
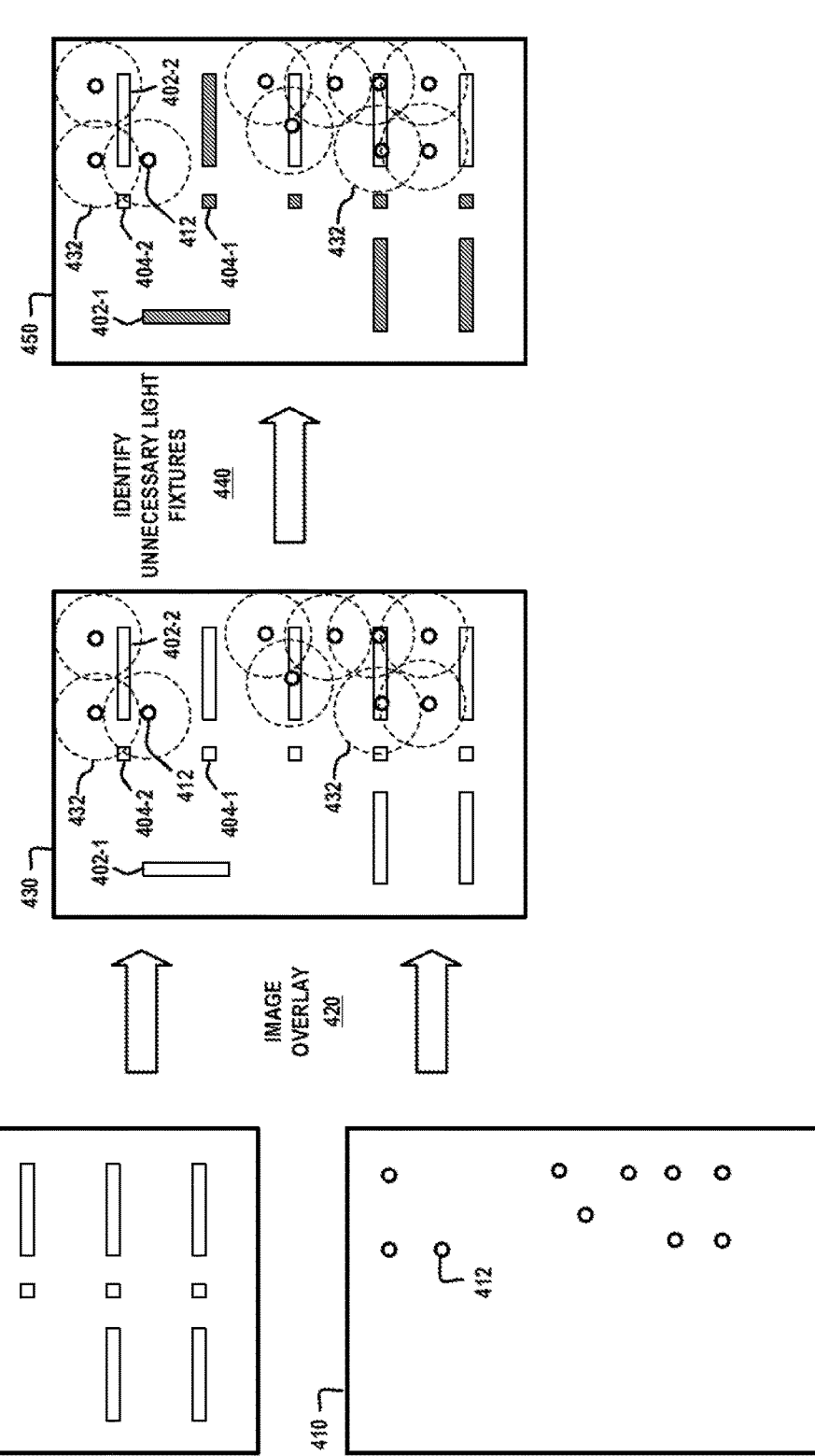
FIG. 4 schematically illustrates a method for computer vision-based energy usage management, according to an exemplary embodiment of the disclosure.

FIG. 4 schematically illustrates a method for computer vision-based energy usage management, according to an exemplary embodiment of the disclosure. More specifically, FIG. 4 schematically illustrates exemplary modes of operation of the object detection system 230 and the object proximity estimation system 240 (FIG. 2), as well as the process of blocks 304, 305, and 306 (FIG. 3A). For example, FIG. 4 illustrates an exemplary first object position image 400 and second object position image 410, which are generated by the object detection system 230. In some embodiments, the first object position image 400 provides a representation of the pattern and location of detected light fixtures within the area corresponding to the ceiling plane image. In FIG. 4, the detected light fixtures are represented by rectangles and squares, such as detected light fixtures 402-1, 402-2, 404-1, and 404-2, which are specifically labeled for purposes of discussion. The second object position image 410 provides a representation of the location of the detected persons within the area corresponding to the floor plane image. In FIG. 4, the detected persons are represented by circles, such as the detected person 412 which is specifically labeled for purposes of discussion.

Furthermore, FIG. 4 illustrates an exemplary image overlay process 420 that is performed to overlay the first and second object position images 400 and 410 and generate an overlay image 430 which is utilized to identify light fixtures that are useful and non-useful based on the locations of the detected persons relative to the locations of the detected light fixtures. The overlay image 430 shows dashed circles 432 (proximity measures) which surround each of the detected persons, e.g., detected person 412. The dashed circles 432 schematically illustrate a process of applying a proximity threshold measure to (i) determine each light fixture that is in close proximity to at least one person, based on the proximity threshold, and (ii) determine each light fixture that is not in close proximity to at least one person, based on the proximity threshold. More specifically, as shown in FIG. 4, the dashed circles 432 associated with respective detected persons either intersect one or more light fixtures, or intersect no light fixtures.

In some embodiments, the object proximity estimation system 240 generates and utilizes the dashed circles 432 as part of a process 440 to identify unnecessary light fixtures. For example, as noted above, in some embodiments, each light fixture that is deemed to be in close proximity to at least one person is deemed to be "useful" while each light fixture that is deemed to not be in close proximity to at least one person is deemed "non-useful." Furthermore, each "non-useful" light fixture that is determined to be turned on at the given time is deemed to contribute to unnecessary energy usage at the given time.

In this regard, FIG. 4 illustrates an exemplary overlay image 450 in which each "non-useful" light fixture which is determined to be turned on and not in close proximity to at least one person is schematically shown as a shaded block, as compared to the other "useful" light fixtures that are schematically shown as non-shaded blocks. For example, in the overlay image 430, the detected light fixtures 402-1 and 404-1 (among others) are determined to not be in close proximity to at least one detected person 412, while the detected light fixtures 402-2 and 404-2 are determined to be in close proximity the at least one detected person 412. As such, in the exemplary overlay image 450, the detected light fixtures 402-1 and 404-1 (among others) are shaded (e.g., identified as turned on, but not useful), while the detected light fixtures 402-2 and 404-2 (among others) are not shaded (e.g., identified as turned on and useful). The exemplary overlay image 450 illustrates the unnecessary turned-on light fixtures at the given point in time that the corresponding video frame or still image was captured and input to the intelligent energy usage management engine for processing.

It is to be appreciated that the exemplary energy management techniques as discussed herein enable automated monitoring of energy utilization (e.g., light fixture usage) in a manner that allows automated tracking of light usage patterns and presence of individuals in office workplaces, automated computation of unnecessary energy consumption (and resulting unnecessary carbon emission) due to, e.g., lighting fixtures being unnecessarily turned on in the office workplaces, and providing intelligent recommendations with regard to the day, time, floor, and area in the floor in which office lights can be switched off or on, which allow facility management to take the appropriate remedial actions to reduce unnecessary energy consumption, and thereby reduce their carbon footprint, and reduce monetary costs for energy consumption.

The exemplary energy management techniques as discussed herein eliminate the need for companies to rely on employees to switch off lights when not in use, or otherwise rely on the facility management personnel to physically monitor light usage and take necessary action. Indeed, it is very time consuming and impractical for the facility management personnel to visit each floor or workspace on a regular basis throughout the day to monitor the presence and location of employees and manually shut off lights that are not needed. Even manual monitoring of light usage through CCTV cameras can be time consuming and burdensome, as it takes time to have someone watching the CCTV cameras and documenting patterns of light usage. Moreover, whether or not someone watching the CCTV cameras and recording the feeds would come up with erroneous findings depends on the person's interests and personality. As a result, it is possible that the right choice will not be made because of flawed data.

The exemplary energy management techniques as discussed herein provide automated tools to identify light usage patterns and employee presence patterns on a floor-by-floor basis. This is particularly useful in view of the hybrid work model where teams decide to come to an office on a specific day in a week recursively. The exemplary energy management techniques enable continued monitoring and mapping of lights to workstation desk numbers to record usage.

Figure 5:
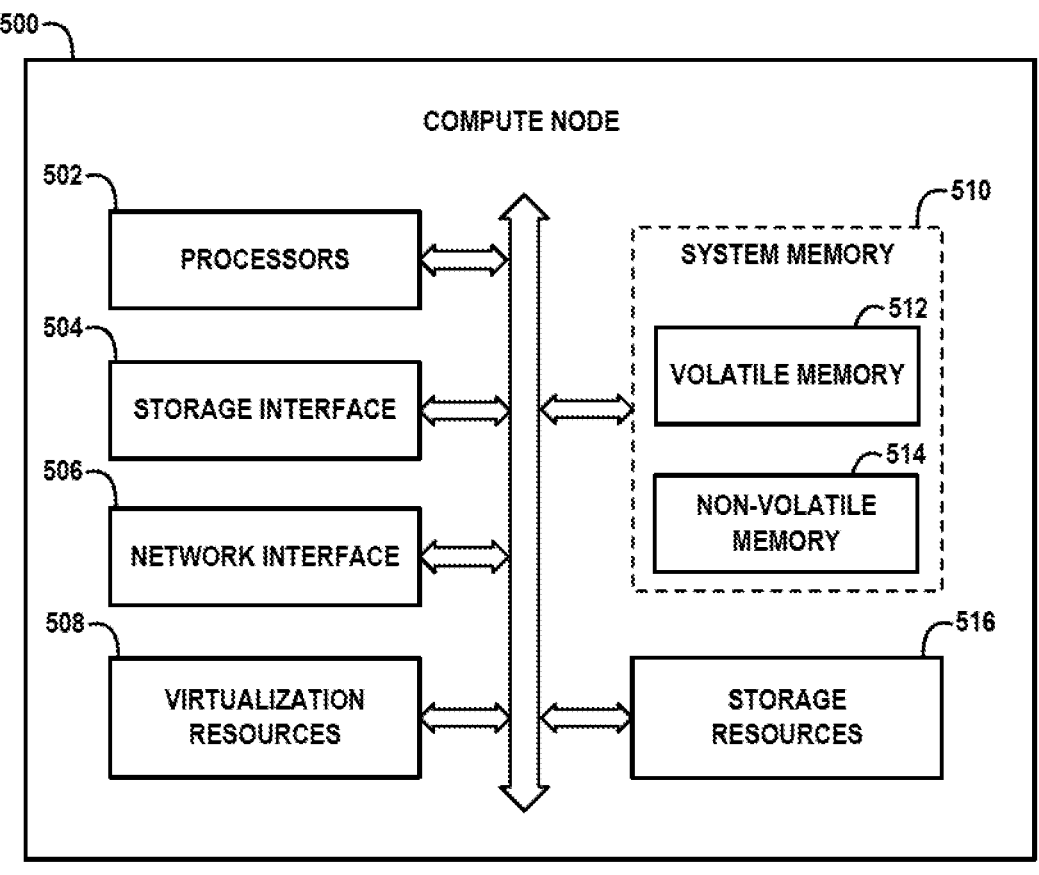
FIG. 5 schematically illustrates a framework of a compute node for hosting software components of a computer vision-based energy usage management system, according to an exemplary embodiment of the disclosure.

FIG. 5 schematically illustrates a framework of a compute node for hosting software components of a computer vision-based energy usage management system, according to an exemplary embodiment of the disclosure. In some embodiments, FIG. 5 illustrates an exemplary embodiment of a compute node 500 for hosting the intelligent energy usage monitoring systems as shown in FIGS. 1 and 2. The compute node 500 comprises processors 502, storage interface circuitry 504, network interface circuitry 506, virtualization resources 508, system memory 510, and storage resources 516. The system memory 510 comprises volatile memory 512 and non-volatile memory 514. The processors 502 comprise one or more types of hardware processors that are configured to process program instructions and data to execute a native operating system (OS) and applications that run on the compute node 500.

For example, the processors 502 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 504 enables the processors 502 to interface and communicate with the system memory 510, the storage resources 516, and other local storage and off-infrastructure storage media, using one or more standard communication and/or storage control protocols to read data from or write data to volatile and non-volatile memory/storage devices. Such protocols include, but are not limited to, NVMe, PCIe, PATA, SATA, SAS, Fibre Channel, etc. The network interface circuitry 506 enables the compute node 500 to interface and communicate with a network and other system components. The network interface circuitry 506 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 508 can be instantiated to execute one or more services or functions which are hosted by the compute node 500. For example, the virtualization resources 508 can be configured to implement the various modules and functionalities as discussed herein. In some embodiment, the virtualization resources 508 comprise virtual machines that are implemented using a hypervisor platform which executes on the compute node 500, wherein one or more virtual machines can be instantiated to execute functions of the compute node 500. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the compute node 500, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 508 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the compute node 500 as well execute one or more of the various modules and functionalities of a storage system as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

In some embodiments, the constituent software components and associated functions of an object routing management system as described, are implemented using program code that is loaded into the system memory 510 (e.g., volatile memory 512), and executed by the processors 502 to perform respective functions as described herein. In this regard, the system memory 510, the storage resources 516, and other memory or storage resources as described herein, which have program code and data tangibly embodied thereon, are examples of what is more generally referred to herein as "processor-readable storage media" that store executable program code of one or more software programs. Computer program products which comprise a non-transitory processor-readable storage medium having stored therein program code of one or more software programs are considered embodiments of the disclosure. A processor-readable storage medium may comprise, for example, a storage device such as a storage disk, a storage array or an integrated circuit containing memory. The term "processor-readable storage medium" as used herein should be understood to exclude transitory, propagating signals.

The system memory 510 comprises various types of memory such as volatile RAM, NVRAM, or other types of memory, in any combination. The volatile memory 512 may be a dynamic random-access memory (DRAM) (e.g., DRAM DIMM (Dual In-line Memory Module), or other forms of volatile RAM. The non-volatile memory 514 may comprise one or more of NAND Flash storage devices, SSD devices, or other types of next generation non-volatile memory (NGNVM) devices. The system memory 510 can be implemented using a hierarchical memory tier structure wherein the volatile memory 512 is configured as the highest-level memory tier, and the non-volatile memory 514 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 502 to execute a native operating system and one or more applications or processes hosted by the compute node 500, and to temporarily store data that is utilized and/or generated by the native OS and application programs and processes running on the compute node 500. The storage resources 516 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A system, comprising:

at least one camera disposed in an environment to capture images of the environment; and at least one computing node which hosts and executes an energy management system that is configured to:

utilize computer vision processing of the images of the environment to extract information from the images;

utilize the extracted information from the images to determine usage patterns of light sources in the environment, the usage patterns comprising usage patterns of light sources which are determined to be turned on and not in close proximity to at least one identified person based on a proximity threshold;

estimate an amount of unnecessary energy consumption based on the determined usage patterns of the light sources in the environment, wherein the estimated amount of unnecessary energy consumption comprises an estimated amount of unnecessary energy consumed by the light sources which are determined to be turned on and not in close proximity to at least one identified person based on the proximity threshold; and generate intelligent recommendations for automated control of the light sources in the environment based on the determined usage patterns and the estimated amount of unnecessary energy consumption, to conserve energy consumption from use of the light sources in the environment.

2. The system of claim 1, wherein the images comprise at least one of still images captured by the at least one camera and video frames of a video generated by the at least one camera.

3. The system of claim 1, wherein in utilizing computer vision processing of the images of the environment to extract information from the images, the energy management system is configured to:

for each image of a plurality of images of the environment, process the image to (i) identify light sources and persons that are present in the environment at a time of the image, and (ii) determine a proximity of the identified persons to the identified light sources to extract proximity information; and determine usage patterns of light sources in the environment based at least in part on the extracted proximity information.

4. The system of claim 1, wherein in utilizing computer vision processing of the images of the environment to extract information from the images, the energy management system is configured to:

for each image of a plurality of images of the environment, extract information from the image by processing the image to: (i) identify light sources that are present and turned on in the environment at a time of the image, (ii) identify persons that are present in the environment at the time of the image, and (iii) determine a proximity of the identified persons to the identified light sources to determine the identified light sources which are in close proximity to at least one identified person based on the proximity threshold, and which are not in close proximity to at least one identified person based on the proximity threshold; and utilize the extracted information to estimate energy usage information and to estimate the amount unnecessary energy consumption.

5. The system of claim 4, wherein in utilizing the extracted information to estimate the energy usage information and to estimate the amount unnecessary energy consumption, the energy management system is configured to:

estimate a total amount of energy consumed by the identified light sources which are determined to be turned on in the environment at the time of the image; and estimate a total amount of unnecessary energy consumed by the identified light sources which are determined to be turned on and not in close proximity to at least one identified person based on the proximity threshold.

6. The system of claim 5, wherein the energy management system is configured to:

estimate a total amount of carbon emission based at least in part on the estimated total amount of energy consumed by the identified light sources which are determined to be turned on in the environment at the time of the image; and estimate a total amount of unnecessary carbon emission based at least in part on the estimated total amount of unnecessary energy consumed by the identified light sources which are determined to be turned on and not in close proximity to at least one identified person.

7. The system of claim 1, wherein in utilizing computer vision processing of the images of the environment to extract information from the images, the energy management system is configured to:

detect a ceiling plane image and a floor plane image in a given image of the environment;

identify light sources that are present in the ceiling plane image;

identify persons that are present in the floor plane image; and determine a proximity of the identified persons to the identified light sources.

8. The system of claim 7, wherein in detecting the ceiling plane image and the floor plane image in the given image of the environment, the energy management system is configured to:

generate a depth image from the given image of the environment;

generate a three-dimensional model from the depth image;

generate a geometric model from the three-dimensional model, wherein the geometric model comprises lines and surfaces representing objects in the given image; and extract a ceiling plane image and floor plane image from the geometric model.

9. The system of claim 7, wherein in determining the proximity of the identified persons to the identified light sources, the energy management system is configured to:

generate a first object position image which represents a location of each identified light source within an area corresponding to the ceiling plane image;

generate a second object position image which represents a location of each identified person within an area corresponding to the floor plane image; and overlay the first and second object position images to determine the proximity of the identified persons to the identified light sources.

10. A computer program product comprising a non-transitory processor-readable storage medium having stored therein program code of one or more software programs, wherein the program code when executed by at least one processing device causes the at least one processing device to:

receive images of an environment from at least one camera disposed in the environment;

utilize computer vision processing of the images of the environment to extract information from the images;

utilize the extracted information from the images to determine usage patterns of light sources in the environment, the usage patterns comprising usage patterns of light sources which are determined to be turned on and not in close proximity to at least one identified person based on a proximity threshold;

estimate an amount of unnecessary energy consumption based on the determined usage patterns of the light sources in the environment, wherein the estimated amount of unnecessary energy consumption comprises an estimated amount of unnecessary energy consumed by the light sources which are determined to be turned on and not in close proximity to at least one identified person based on the proximity threshold; and generate intelligent recommendations for automated control of the light sources in the environment based on the determined usage patterns and the estimated amount of unnecessary energy consumption, to conserve energy consumption from use of the light sources in the environment.

11. The computer program product of claim 10, wherein the images comprise at least one of still images captured by the at least one camera and video frames of a video generated by the at least one camera.

12. The computer program product of claim 10, wherein the program code to utilize computer vision processing of the images of the environment to extract information from the images, comprises program code to cause the at least one processing device to:

for each image of a plurality of images of the environment, process the image to (i) identify light sources and persons that are present in the environment at a time of the image, and (ii) determine a proximity of the identified persons to the identified light sources to extract proximity information; and determine usage patterns of light sources in the environment based at least in part on the extracted proximity information.

13. The computer program product of claim 10, wherein the program code to utilize computer vision processing of the images of the environment to extract information from the images, comprises program code to cause the at least one processing device to:

for each image of a plurality of images of the environment, extract information from the image by processing the image to: (i) identify light sources that are present and turned on in the environment at a time of the image, (ii) identify persons that are present in the environment at the time of the image, and (iii) determine a proximity of the identified persons to the identified light sources to determine the identified light sources which are in close proximity to at least one identified person based on the proximity threshold, and which are not in close proximity to at least one identified person based on the proximity threshold; and utilize the extracted information to estimate energy usage information and to estimate the amount the unnecessary energy consumption.

14. The computer program product of claim 13, wherein the program code to utilize the extracted information to estimate the energy usage information and to estimate the amount the unnecessary energy consumption, comprises program code to cause the at least one processing device to:

estimate a total amount of energy consumed by the identified light sources which are determined to be turned on in the environment at the time of the image; and estimate a total amount of unnecessary energy consumed by the identified light sources which are determined to be turned on and not in close proximity to at least one identified person based on the proximity threshold.

15. The computer program product of claim 14, further comprising program code to cause the at least one processing device to:

estimate a total amount of carbon emission based at least in part on the estimated total amount of energy consumed by the identified light sources which are determined to be turned on in the environment at the time of the image; and estimate a total amount of unnecessary carbon emission based at least in part on the estimated total amount of unnecessary energy consumed by the identified light sources which are determined to be turned on and not in close proximity to at least one identified person.

16. The computer program product of claim 10, wherein the program code to utilize computer vision processing of the images of the environment to extract information from the images, comprises program ode to cause the at least one processing device to:

detect a ceiling plane image and a floor plane image in a given image of the environment;

identify light sources that are present in the ceiling plane image;

identify persons that are present in the floor plane image; and determine a proximity of the identified persons to the identified light sources.

17. The computer program product of claim 16, wherein the program code to detect the ceiling plane image and the floor plane image in the given image of the environment, comprises program code to cause the at least one processing device to:

generate a depth image from the given image of the environment;

generate a three-dimensional model from the depth image;

generate a geometric model from the three-dimensional model, wherein the geometric model comprises lines and surfaces representing objects in the given image; and extract a ceiling plane image and floor plane image from the geometric model.

18. The computer program product of claim 16, wherein the program code to determine the proximity of the identified persons to the identified light sources, comprises program code to cause the at least one processing device to:

generate a first object position image which represents a location of each identified light source within an area corresponding to the ceiling plane image;

generate a second object position image which represents a location of each identified person within an area corresponding to the floor plane image; and overlay the first and second object position images to determine the proximity of the identified persons to the identified light sources.

19. A method, comprising:

receiving images of an environment from at least one camera disposed in the environment;

utilizing computer vision processing of the images of the environment to extract information from the images;

utilizing the extracted information from the images to determine usage patterns of light sources in the environment, the usage patterns comprising usage patterns of light sources which are determined to be turned on and not in close proximity to at least one identified person based on a proximity threshold;

estimating an amount of unnecessary energy consumption based on the determined usage patterns of the light sources in the environment, wherein the estimated amount of unnecessary energy consumption comprises an estimated amount of unnecessary energy consumed by the light sources which are determined to be turned on and not in close proximity to at least one identified person based on the proximity threshold; and generating intelligent recommendations for automated control of the light sources in the environment based on the determined usage patterns and the estimated amount of unnecessary energy consumption, to conserve energy consumption from use of the light sources in the environment.

20. The method of claim 19, wherein:

utilizing computer vision processing of the images of the environment to extract information from the images, comprises:

for each image of a plurality of images of the environment, extract information from the image by processing the image to: (i) identify light sources that are present and turned on in the environment at a time of the image, (ii) identify persons that are present in the environment at the time of the image, and (iii) determine a proximity of the identified persons to the identified light sources to determine the identified light sources which are in close proximity to at least one identified person based on the proximity threshold, and which are not in close proximity to at least one identified person based on the proximity threshold; and utilizing the extracted information to estimate energy usage information and to estimate the amount the unnecessary energy consumption by: (i) estimating a total amount of energy consumed by the identified light sources which are determined to be turned on in the environment at the time of the image; and (ii) estimating a total amount of unnecessary energy consumed by the identified light sources which are determined to be turned on and not in close proximity to at least one identified person based on the proximity threshold; and the method further comprises:

estimating a total amount of carbon emission based at least in part on the estimated total amount of energy consumed by the identified light sources which are determined to be turned on in the environment at the time of the image; and estimating a total amount of unnecessary carbon emission based at least in part on the estimated total amount of unnecessary energy consumed by the identified light sources which are determined to be turned on and not in close proximity to at least one identified person.

* * * * *